US008620559B2

(12) United States Patent
Jehle et al.

(10) Patent No.: US 8,620,559 B2
(45) Date of Patent: Dec. 31, 2013

(54) METHOD FOR EXECUTING TASKS AND SYSTEM COMPRISING A FIRST AND A SECOND CONTROL DEVICE

(75) Inventors: Martin Jehle, Regensburg (DE); Wolfgang Moser, Regensburg (DE); Peter Russe, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 861 days.

(21) Appl. No.: 12/544,549

(22) Filed: Aug. 20, 2009

(65) Prior Publication Data

US 2010/0049418 A1 Feb. 25, 2010

(30) Foreign Application Priority Data

Aug. 25, 2008 (DE) ......................... 10 2008 039 564

(51) Int. Cl.
*G06F 19/00* (2011.01)
*G06F 7/00* (2006.01)
*G06F 17/00* (2006.01)
*F02M 51/00* (2006.01)

(52) U.S. Cl.
USPC ....... 701/102; 701/103; 123/406.12; 123/480

(58) Field of Classification Search
USPC ....... 701/102, 103, 104; 123/198 F, 479, 480, 123/481, 406.12
See application file for complete search history.

(56) References Cited

U.S. PATENT DOCUMENTS

| | | | | |
|---|---|---|---|---|
| 4,812,840 | A * | 3/1989 | Girard | 379/161 |
| 4,958,616 | A * | 9/1990 | Di Nunzio et al. | 123/635 |
| 5,497,751 | A * | 3/1996 | Ohtake | 123/479 |
| 6,336,439 | B1 * | 1/2002 | Frohn et al. | 123/406.13 |
| 6,882,926 | B2 * | 4/2005 | Thoss et al. | 701/102 |
| 7,228,372 | B2 * | 6/2007 | Yoshimura et al. | 710/110 |
| 7,277,789 | B1 * | 10/2007 | Gibson et al. | 701/104 |
| 7,284,514 | B2 | 10/2007 | Grider | F01L 1/34 |
| 7,725,230 | B2 * | 5/2010 | Knoefler et al. | 701/48 |
| 7,865,290 | B2 * | 1/2011 | Gibson et al. | 701/103 |
| 2008/0000454 | A1 * | 1/2008 | Grider | 123/481 |
| 2009/0159044 | A1 * | 6/2009 | Miyao | 123/406.37 |

FOREIGN PATENT DOCUMENTS

| | | | | |
|---|---|---|---|---|
| DE | 102005060665 | A1 | 6/2007 | |
| DE | 102007006174 | A1 | 8/2007 | F02D 45/00 |
| DE | 102006030592 | A1 | 2/2008 | F02D 45/00 |

* cited by examiner

*Primary Examiner* — Mahmoud Gimie
*Assistant Examiner* — David Hamaoui
(74) *Attorney, Agent, or Firm* — King & Spalding L.L.P.

(57) ABSTRACT

A system and a method for executing tasks for an internal combustion engine (14) has two control devices (1, 2), with the two control devices (1, 2) being provided in order to process the tasks independently of one another, with the first control device (1) having a first release signal and a first switchover signal, with the second control device having a second release signal and a second switchover signal, with, by exchanging the two release signals and the two switchover signals, it being defined that only one of the two control devices (1, 2) executes a defined task at the same time.

20 Claims, 2 Drawing Sheets

METHOD FOR EXECUTING TASKS AND SYSTEM COMPRISING A FIRST AND A SECOND CONTROL DEVICE

CROSS-REFERENCE TO RELATED APPLICATIONS

This application claims priority to DE Patent Application No. 10 2008 039 564.1 filed Aug. 25, 2008, the contents of which is incorporated herein by reference in its entirety.

TECHNICAL FIELD

The invention relates to a method for executing tasks in an internal combustion engine comprising two control devices. The invention also relates to a system comprising two control devices for executing tasks in an internal combustion engine.

BACKGROUND

In engines with a large number of cylinders, two electronic control devices are often used, which are each assigned to a first and/or a second cylinder bank of the engine. The two control devices can access measurement data independently of one another, said data relating to the engine position as well as to additional measured values concerning the separate cylinder bank in each instance. One of the two control devices is usually defined as the master control device, which evaluates the actuation of the accelerator pedal in the motor vehicle for instance. The two control devices are connected to one another by way of a communication path, for instance a CAN bus.

DE 10 2006 030 592 A1 discloses a method for operating at least two engine control devices which are connected to one another in a master/slave configuration. Two control devices are provided in this way, which each execute a function for the internal combustion engine, which includes functions with angular synchronism which are attuned to the rpm of the engine. The same sensor system data of the identified engine position is available to the two control devices. When sending a command relating to a function with angular synchronism from the master control device to the slave control device, additional information representing the momentary engine position is also sent. The slave control device uses this information together with the momentary engine position provided upon receipt of this information in order to execute its function with angular synchronism to the master slave device.

In various instances a synchronization of the functions which run on the two control devices is necessary. Certain functions may in this way only run on one control device since otherwise a mutual interference would occur.

SUMMARY

According to various embodiments, an improved method for executing tasks of an internal combustion engine comprising two control devices and an improved system for executing tasks of an internal combustion engine using two control devices can be provided.

According to an embodiment, a method for executing tasks for an internal combustion engine comprising two control devices, with the two control devices being provided in order to process the tasks independently of one another, with the first control device having a first release signal and a first switchover signal, with the second control device having a second release signal and a second switchover signal, comprises the step of determining by exchanging the two release signals and the two switchover signals that only one of the two control devices executes a defined task at the same time.

According to a further embodiment, the method may further comprise the following steps: in the case of the first control device, the first release signal being set to active and the first switchover signal being set to inactive, with, after executing a task or if a task to be executed does not exist, the first control device again setting the first release signal to inactive, with the first control device then setting the first switchover signal to active, with the first release signal and the first switchover signal being transmitted to the second control device, with the second control device, in the case of an inactive first release signal and in the case of an active first switchover signal setting the second release signal to active and leaving the second switchover signal as inactive, with the second release signal and the second switchover signal being transmitted to the first control device, with the first control device setting the first switchover signal to inactive after obtaining the active second release signal and the inactive second switchover signal. According to a further embodiment, the method may comprise the following further steps: the second control device resetting the second release signal to inactive after executing a task or if a task to be executed does not exist, with the second control device then setting the second switchover signal to active, with the second release signal and the second switchover signal being transmitted to the first control device, with the first control device, in the case of an inactive second release signal and in the case of an active second switchover system setting the first release signal to active and leaving the first switchover signal as inactive, with the first release signal and the first switchover signal being transmitted to the second control device, with the second control device setting the second switchover signal to inactive after obtaining the active first release signal and the inactive first switchover signal. According to a further embodiment, the first release and the first switchover signal and the second release and the second switchover signal can be exchanged between the control devices at defined time intervals. According to a further embodiment, the first release and the second switchover signal and the second release and the second switchover signal can be transmitted after executing a task. According to a further embodiment, a function, in particular for influencing the combustion in the internal combustion engine, can be used as a task. According to a further embodiment, an adjustment of a parameter may be used as a task. According to a further embodiment, a diagnostic function may be used as a task. According to a further embodiment, the first control device may control functions for a first number of cylinders in the internal combustion engine, with the second control device controlling a function of a second number of cylinders in the internal combustion engine, and with a cylinder equalization being executed by the first or second control device as a task. According to a further embodiment, the release for the execution of a task can be continually toggled between the two control devices if no task is to be processed or is able to be processed in either of the two control devices. According to a further embodiment, at least one priority signal can be exchanged between the two control devices, which indicates that the sending control device has a certain priority and that the receiving control device, in the case of a lower priority, either emits the release for the execution of a task to the other control device immediately or after the task being executed has concluded. According to a further embodiment, the information can be stored in a non-volatile fashion in a memory prior to switching off the first and second control device, for which control device the release signal is switched to active. According to a further embodiment, during boot-up of the two control devices, a first control device may check whether the release signal is stored as active for one of the two control devices, with the first control device setting the first switchover signal to active if neither the first nor the second release signal is stored as active, with the first control device transmitting the first release signal, which is inactive, and the second switchover signal to the second control device. According to a further embodiment, an active first control device, which has just executed a task or if no task to be executed exists, may check prior to a transfer to the other second control device the state of the switchover signal of the second control device, and with the first control device only setting the first release signal to inactive in the case of an inactive state of the switchover signal and setting the first switchover signal to active, with the first release signal and the first switchover signal being transmitted to the second control device.

According to another embodiment, a system may comprise a first and a second control device for executing tasks for an internal combustion engine, wherein the first and the second control device being connected by way of a signal path, with the first control device having a first memory with a first release bit for the first release signal and a first switchover bit for the first switchover signal, with the second control device having a second memory with a second release bit for the second release signal and a second switchover bit for the second switchover signal, with the two control devices not simultaneously executing defined tasks but instead defining by way of exchanging the first and the second release signal and the first and the second switchover signal that only one control device can execute a defined task at the same time.

BRIEF DESCRIPTION OF THE DRAWINGS

The invention is explained in more detail with reference to the Figures, in which.

DETAILED DESCRIPTION

Figure 1:
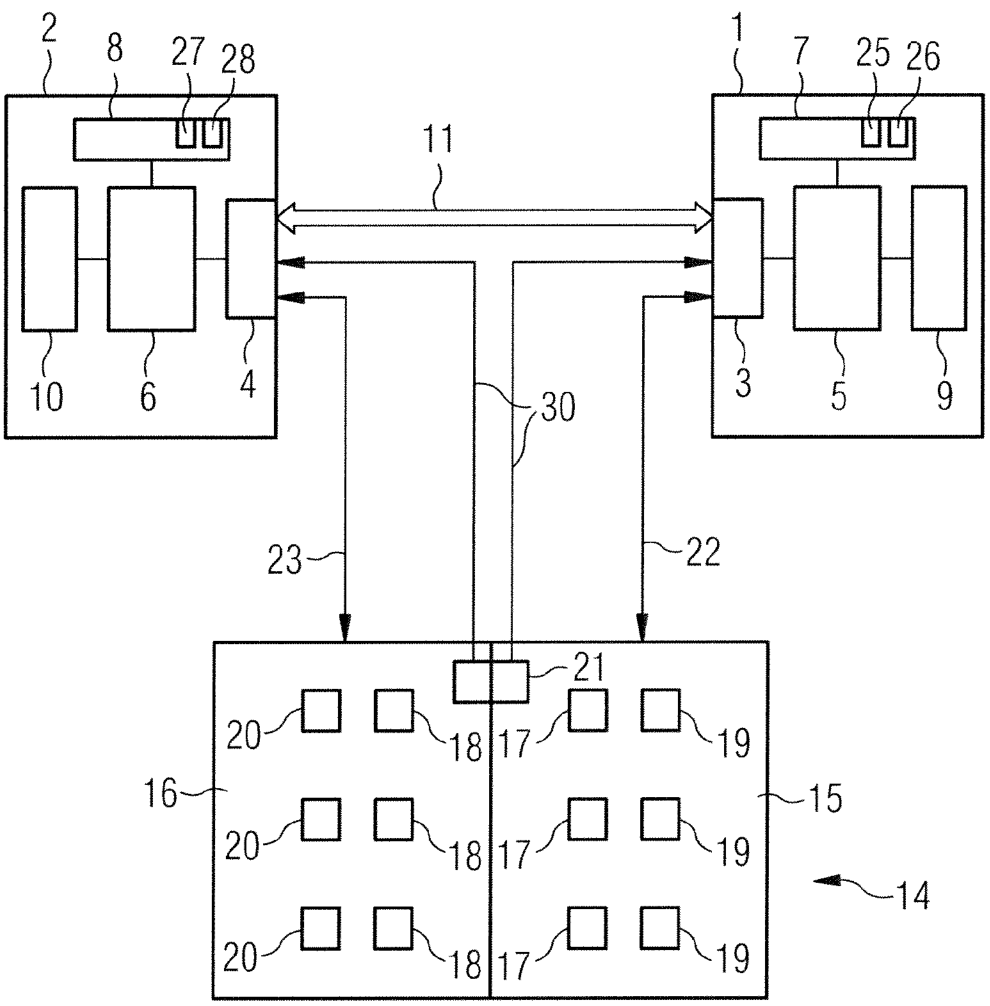
FIG. 1 shows a schematic representation of an internal combustion engine comprising two control devices and FIG. 2 shows a temporal course of release and switchover signals between two control devices.

The method and the system according to various embodiments are advantageous in that they enable a reliable calibration between the two control devices, thereby ensuring that the two control devices do not execute a defined task at the same time. The risk of a mutual interference is reduced in this way.

The first control device advantageously may have a first release signal and a first switchover signal. The second control device has a second release signal and a second switchover signal, with, in the case of the first control device, the first release signal being set to active and the first switchover signal being set to inactive, whereby, after executing a task or when a task to be executed does not exist, the first control device resets the first release signal to inactive, with the first control device then setting the first switchover signal to active, with the first release signal and the first switchover signal being transmitted to the second control device, with the second control device in the case of an inactive first release signal and in the case of an active first switchover signal setting the second release signal to active and leaving the second switchover signal as inactive, with the second release signal and the second switchover signal being transmitted to the first control device, with the first control device setting the first switchover signal to inactive after obtaining the active second release signal and the inactive second switchover signal.

A further improvement to the method is achieved by the second control device resetting the second release signal to inactive after executing a task or when a task to be executed is not present, with the second control device then setting the second switchover signal to active, with the second release signal and the second switchover signal being transmitted to the first control device, with the first control device setting the first release signal to active in the case of an inactive second release signal and in the case of an active second switchover signal and leaving the first switchover signal as inactive, with the first release signal and the first switchover signal being transmitted to the second control device, with the second control device setting the second switchover signal to inactive after obtaining the active first release signal and the inactive first switchover signal.

In a further embodiment, the first release signal and the first switchover signal and the second release signal and the second switchover signal are exchanged at defined time intervals between the control devices. Precise calibration is achieved as a result.

In a further embodiment, the first release signal and the first switchover signal and the second release signal and the second switchover signal are always transferred by means of the control device to be executed after executing a task. A temporally precise calibration is thus possible.

A function, in particular for influencing the combustion of the internal combustion engine, a diagnosis function or an adaptation of a parameter of a function for instance can be used as a task.

In a further embodiment, the release for the execution of a task is continually toggled between the two control devices, if a task is not or cannot be executed in either of the two control devices. This ensures that if a task to be executed appears, the corresponding control device also promptly obtains the release for the execution of the task.

In one embodiment, a priority signal is exchanged between the two control devices, said priority signal indicating the priority of a control device. As a function of the priority of the control device, which checks the execution of a task or executes a task, in the case of a lower priority the control device transfers a release to the other control device in order to begin the execution of a task either immediately or after terminating the task currently to be executed. This ensures that the control device with the higher priority obtains the release for the execution of a task in the case of urgent tasks, although the other control device is currently executing a task or further tasks to be executed are available.

In a further embodiment, the information indicating for which control device the release signal is switched to active is stored in a non-volatile fashion in a storage device prior to switching off the first and second control device. This information can thus be used when booting up the control devices and the correct control device can be switched to active again in respect of the release signal.

In a further embodiment, when booting up the two control devices, the first control device checks whether the release signal is set to active for one of the two control devices. The first control device sets the first switchover signal to active if neither the first nor the second release signal is stored as active, with the first control device transmitting the first release signal which is inactive and the first switchover signal to the second control device. In this way a defined start phase is provided for the assignment of the release signals and the switchover signals.

FIG. 1 shows a schematic representation of an internal combustion engine 14 comprising a first cylinder bank 15 and a second cylinder bank 16. The first cylinder bank 15 has three first cylinders 17 and three first injection valves 19. The second cylinder bank 16 has three second cylinders 18 and three second injection valves 20. Sensors 21 are also provided which detect the operating parameters of the internal combustion engine 14. The sensors 21 in this way detect sensor values for both cylinder banks 15, 16 or individually for each cylinder and for each injection valve separately.

A first and a second control device 1, 2 are also provided. The first and the second control device 1, 2 are connected to one another by way of a data bus 11. Each control device 1, 2 has an input interface 3, 4, a processor 5, 6, a data storage device 7, 8 and a program memory 9, 10. The input interfaces 3, 4 are connected to the data bus 11 in each instance. The processor 5, 6 is moreover connected to the associated input interface 3, 4, the assigned data storage device 7, 8 and the assigned program memory 9, 10 in each instance. In the first data storage device 7, a first release bit 25 is stored for the first release signal and a first switchover bit 26 is stored for the first switchover signal. In the second data storage device 8, a second release bit 27 is stored for the second release signal and a second switchover bit 28 is stored for the second switchover signal. In the first and second release bit and in the first and second switchover bit, the values for the level, i.e. either high or low, are stored for the first and second release signal and for the first and second switchover signal. The first and second input interfaces 3, 4 are furthermore connected to the sensors 21 by way of sensors lines 30. The first and the second input interface 3, 4 are moreover connected to the first and second control lines 22, 23. The first and second control lines 22, 23 are guided to actuators in the internal combustion engine 14, in particular to actuators in the first and/or second cylinder bank 15, 16. The first and second control lines 22, 23 are connected to the injection valves 19, 20 for instance.

In the exemplary embodiment shown, the first control device 1 is provided for the control of the first cylinder bank 15 and the second control device 2 is provided for the control of the second cylinder bank 16.

In the embodiment shown, the first control device 1 is embodied as a master control device and the second control device 2 is embodied as a slave control device. The first and second control device 1, 2 have programs in the program memories 9, 10 and data, characteristic curves and engine characteristics maps in the data storage devices 7, 8 in order to be able to execute tasks like for instance control functions of the internal combustion engine or diagnostic functions of the internal combustion engine or adaptations of parameters of the functions or adaptations of the functions. The tasks, in particular functions, diagnostic functions and adaptations of the parameters or functions can generally be executed simultaneously on the two control devices and independently of one another. The functions are the control of the injection for instance, the control of the ignition, the control of the air supply etc. The diagnostic function relates to the functions of the internal combustion engine and the function of the sensors. During the adaptation of the functions, parameters of the functions or the functions themselves can be adjusted to new boundary conditions.

In different situations, a synchronization of the tasks which run on the two control devices is necessary. Certain functions, certain adaptations of functions or certain diagnostic functions may in this way only be executed on one of the two control devices in each instance, since a mutual interference would otherwise take place.

An example of this is a cylinder equalization function, which alters operating parameters of a cylinder, detects the irregular running of the internal combustion engine and calculates an adaptation value as a function hereof. The adaptation value relates to a factor or an adaptive correction of the injection quantity. This function must be implemented for all cylinders of the internal combustion engine, with a simultaneous adjustment of several cylinders having to be ruled out. The function may therefore also only be active on one of the two control devices, i.e. executed, if the predetermined adaptations conditions exist.

At the same time it is possible for the conditions, which enable the adaptation of one of the cylinder banks, and/or define the need for an adaptation of one of the cylinder banks, to behave differently on the two banks. It can last different amounts of time, until the cylinder equalization has ruled out the adaptation of the parameters for the control of the injection for all cylinders of a bank. If in the event of the equalization all cylinders of a cylinder bank are already adapted, but an individual injection valve is nevertheless subsequently exchanged in the workshop, the adaptation for the relevant cylinder, which is assigned to the exchanged injection valve, is only implemented again on the relevant cylinder bank.

A rigid program run, which alternately activates the tasks for a specific time on a control device and then switches to the other control device, in many instances affords valuable adaptation time. A flexible control is necessary in order to optimally use the available adaptation or diagnosis time. The flexible control allows the tasks, in particular the function, the adaptation or diagnosis, to be activated on the control device, on which the possibility and need for the function, the adaptation or the diagnosis exists, with the activation of the same function, the same activation or the same diagnosis simultaneously being ruled out on the other control device.

The first and the second control device 1, 2 each have a first release signal and a first switchover signal and/or a second release signal and a second switchover signal, which the two control devices exchange. The first and the second release signal, and the first and second switchover signal, define which of the two control devices can execute a task. This ensures that only one of the two control devices executes a task at the same time.

Figure 2:
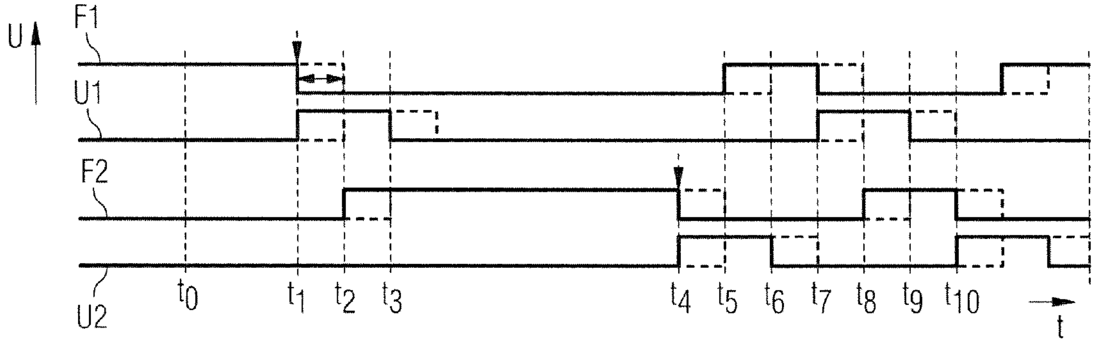

FIG. 2 shows a temporal diagram for the exchange of the first and second release signal and the first and second switchover signal between the first and the second control device 1, 2.

At time instant $t_0$, the first control device 1 executes a task or checks whether a task exists. At this time instant, the first release signal F1, which is shown in the diagram as the topmost characteristic curve, has a high voltage level. The first switchover signal U1, which is shown as the second characteristic curve in FIG. 2, as viewed from above, has a lower voltage level in this situation. A low voltage level may be 0 volts and a high voltage level may be 1 volt. The first release signal and the first switchover signal are present in the first control device 1. The second release signal F2 has a low voltage level at time instant $t_0$. The second switchover signal U2 likewise has a low voltage level at time instant $t_0$. The second release signal and the second switchover signal are present in the second control device 2 and the second control device 2 does not implement any task at time instant $t_0$ and also does not check for the implementation of a task.

At time instant $t_0$, the first control device 1 has terminated the task to be executed. The first release signal is thus reduced from a high level to a low level. At the same time, the first switchover signal is increased from a low level to a high level.

The first release signal and the first switchover signal are transmitted from the first control device 1 to the second control device 2.

Due to the low voltage level of the first release signal and the high voltage level of the first switchover signal, the second control device 2 identifies that a release is transmitted to the second control device in order to implement the execution of a task or to check the execution of a task. The transmission and processing of the information requires some time so that the second control device 2 only changes the second release signal from a low voltage level to a high voltage level at the second time instant $t_2$. The second release signal and the second switchover signal are then transmitted to the first control device. The first control device identifies the levels of the second release signal and the second switchover signal and identifies that the second control device has begun to check the execution of a task or to execute a task. Consequently at the third time instant $t_3$, the first control device 1 changes the first switchover signal from a high level to a low level. The transmission of the release from the first control device to the second control device is thus concluded.

In the exemplary embodiment shown, the second control device 2 executes a task. A function for the control of the internal combustion engine, in particular for the control of the combustion of the internal combustion engine, can be used as the task. Additionally, a diagnostic function for monitoring the functional capability of the internal combustion engine and/or of sensors in the internal combustion engine can be used as the task.

The adjustment of a function or a parameter, in particular of a parameter of a function or a diagnostic function, can also be used as a task. For instance, as cited above, a cylinder equalization function can be executed.

After executing the task, the second control device 2 sets the second release signal at the fourth time instant $t_4$ to a low voltage level. Furthermore, at time instant $t_4$, the second control device 2 sets the second switchover signal to a high voltage level. The second release signal and the second switchover signal are transmitted to the first control device 1. After evaluating the second release signal and the second switchover signal, the first control device 1 identifies the transfer of a release and at the fifth time instant $t_5$ increases the first release signal from the low voltage level to the high voltage level. Furthermore, the first control device transfers the first release signal and the first switchover signal to the second control device 2. After evaluating the transmitted first release signal and the first switchover signal at the sixth time instant $t_6$, the second control device 2 reduces the second switchover signal from a high voltage value to a low voltage value.

The first control device 1 checks whether a task is to be executed. In the exemplary embodiment shown, no task is to be executed at this time instant, so that the first control device at the seventh time instant $t_7$ reduces the first release signal from the high voltage level to a low voltage level and increases the first switchover signal from a low voltage level to a high voltage level. At the same time, the first release signal and the first switchover signal are transmitted to the second control device. The second control device identifies, as a result of the existing voltage levels of the first release signal and of the first switchover signal, that a release exists for the execution of a task. At the eighth time instant $t_8$, the second control device thus increases the second release signal from a low voltage level to a high voltage level. The second control device subsequently transmits the second release signal and the second switchover signal to the first control device. The first control device identifies as a result of the received voltage level for the second release signal to the second switchover signal that the second control device has adopted the release in order to check or execute a task. At the ninth time instant $t_9$, the first control device thus reduces the first switchover signal from a high voltage level to a low voltage level.

After the eighth time instant $t_8$, the second control device checks whether a task to be executed is present. This is however not the case, so that the second control device, at the tenth time instant $t_{10}$, reduces the voltage value for the second release signal from a high to a low voltage level and at the same time increases the voltage level of the second switchover signal from a low voltage level to a high voltage level. The second release signal and the second switchover signal are transmitted to the first control device. The first control device thus identifies that it can adopt the release for the execution of a task.

In addition to the described exchange of the first release signal and of the first switchover signal and of the second release signal and of the second switchover signal, an additional signal, for instance a priority signal, can also be exchanged between the first and the second control device. The additional signal can also be used by the control devices for the decision as to which of the two control devices is able to adopt the release in order to check and execute a task.

It is possible to define for instance that in addition to the first release signal and the first switchover signal, a first priority signal with the first release signal and the first switchover signal in each instant or independently thereof is transmitted to the second control device. Similarly, the second control device, simultaneously with the second release signal and the second switchover signal or independently thereof, can transmit a second priority signal to the first control device. The first and the second priority signal can define a priority stage for the first and the second control device. For instance, the first control device may comprise the priority stage 1 and the second control device the priority stage 2. If the second control device, which is currently executing a task, now receives a first priority signal which indicates a higher priority for the first control device, the task to be executed is either still accomplished and then even if an additional task exists, the release for the execution of tasks is transmitted to the first control device, or, in a further embodiment, after receipt of a first priority signal which indicates a higher priority, the execution of the task is interrupted and the release for executing a task is transmitted. The first control device can correspondingly receive a second priority signal which has a higher priority than the first priority signal.

In a further embodiment, the active control device, e.g. the first control device, checks that a task currently to be executed has ended or if no tasks to be executed exist, checks the level of the switchover signal of the other control device, i.e. the second control device. The active first control device only then initiates a transfer for the execution of a task if the switchover level of the second control device has a low level, i.e. is inactive. If the switchover signal of the second control device has a high level, i.e. is active, then the active control device waits with the transfer until the level of the switchover signal of the second control device has a low level. If the check shows that the level of the switchover signal of the second control device has a low level, then the active first control device reduces the first release signal from a high level to a low level. At the same time, the active first control device increases the first switchover signal from a low level to a high level. The first release signal and the first switchover signal are transmitted from the first control device 1 to the second control device 2. A transfer can thus only then be initiated if the inactive control device is ready, i.e. has a switchover signal with a low level.

As a function of the selected embodiment, the first release signal and the first switchover signal and the second release signal and the second switchover signal are transmitted at defined time intervals to the other control device. In addition, in a further embodiment, when changing a voltage level of a first release signal or a first switchover signal or a second release signal or a second switchover signal, the new voltage level can be transmitted in each instant to the other control device. Furthermore, in a further embodiment, only the changing voltage level of the changing first control signal, first switchover signal, second control signal or second switchover signal, can be transmitted to the other control device.

In a further embodiment, the first and the second control device 1, 2 have a detection unit, which detects a voltage edge, i.e. a change in the voltages of the first release signal and the first switchover signal and/or the second release signal and the second switchover signal and thus identifies a change in the voltage level of the release and/or switchover signal.

The release for the execution of a task can be toggled between the control devices, if neither of the two control devices has a task to be executed or is able to execute a task.

The first release signal and the first switchover signal can be stored in the first data storage device 7 in the form of a first release bit and a first switchover bit. Similarly, the second release signal and the second switchover signal can be stored in the second data storage device 8 in the form of a second release bit and a second switchover bit.

In a further embodiment, the first release signal and the first switchover signal and the second release signal and the second switchover signal are stored in a non-volatile fashion in the first data storage device 7 and/or second data storage device 8 prior to switching off the first and the second control device. The last release state can thus be recorded when booting up and the first and second control device are operated further in said state by the control devices which was switched off.

In a further embodiment, when booting up the two control devices, the first control device checks whether the release signal for one of the two control devices is set to active, with the first control device setting the first switchover signal to active if the release signal is not set to active for either of the two control devices. The first control device transmits the first release signal, which is not active, and the first switchover signal to the second control device.

In the embodiments in FIG. 2, an active signal is understood as a signal with a high voltage level and an inactive signal is understood as a signal with a low voltage level. Instead of a high and low voltage level, any other type of coding, e.g. certain frequencies or pulse lengths, can also be used.

By using two signals (release and switchover signal) in each instance which are exchanged in both directions between the control devices, a robust functionality can be achieved which is insensitive to communication delays and the non-evaluation of individual transmitted signals. The control device, which triggers the switchover process, waits until the other control device acknowledges the switchover process. It is only then that the control device to be triggered resets the switchover signal. The receiving control device can then only request a new switchover if this has taken place. This rules out the possibility of a control device missing a switchover process as a result of the failure to transmit a signal or asynchronously running functions. This likewise excludes the function being simultaneously active on both control devices. A particularly minimal data exchange between the two control devices is necessary because in the simplest instance of only conditions of the actual control device having to be evaluated. Only two signals or two data bits are to be transmitted in each direction. A suitable definition of the conditions as to when a switchover is to take place from one control device to the other control device allows the execution of the tasks to be configured in a more flexible fashion on both control devices. The associated software algorithm can be easily implemented and is identical on both control devices. It can be used as a standard program for different tasks. Only the definition of the conditions as to when a switchover to the other control device is to take place can be adjusted in a task-specific fashion.

What is claimed is:

1. A method for executing tasks for an internal combustion engine comprising two control devices each operable to process tasks independently of the other, the method comprising:

adjusting operating parameters of the engine, wherein an adaptive adjustment is performed only by one of the two control devices at a time, wherein adjusting the operating parameters comprises:

checking whether a first adaptive task is to be executed by the first control device;

if the first adaptive task is to be executed, maintaining an active level for a first release signal associated with the first control device and an inactive level for a first switchover signal associated with the first control device during execution of the first adaptive task;

upon completion of the first adaptive task, reducing the first release signal to the inactive level and increasing the first switchover signal to the active level;

receiving the first release signal and the first switchover signal at the second control device; and interpreting the inactive level first release signal and the active level first switchover signal as permission to implement a second adaptive task at the second control device;

wherein the two control devices cooperatively control respective engine actuators.

2. The method according to claim 1, further comprising:

increasing a second release signal to the active level and maintaining a second switchover signal at the inactive level during execution of the second adaptive task; and upon completion of the second adaptive task, reducing the second release signal to the inactive level and increasing the second switchover signal to the active level.

3. The method according to claim 2, further comprising:

receiving the second release signal and the second switchover signal at the second control device; and interpreting the inactive level second release signal and the active level second switchover signal as permission to implement a third a active task at the first control device.

4. The method according to claim 2, wherein the first release and the first switchover signal and the second release and the second switchover signal being exchanged between the control devices at defined time intervals.

5. The method according to claim 1, wherein the first release and the second switchover signal and the second release and the second switchover signal being transmitted after executing an adaptive task.

6. The method according to claim 1, wherein a function being used as an adaptive task.

7. The method according to claim 6, wherein the function is a function for influencing the combustion in the internal combustion engine.

8. The method according to claim 1, wherein an adjustment of a parameter being used as an adaptive task.

9. The method according to claim 1, wherein a diagnostic function being used as an adaptive task.

10. The method according to claim 1, wherein the first control device controlling functions for a first number of cylinders in the internal combustion engine, wherein the second control device controlling a function of a second number of cylinders in the internal combustion engine, and wherein a cylinder equalization being executed by the first or second control device as an adaptive task.

11. The method according to claim 1, wherein the release for the execution of an adaptive task being continually toggled between the two control devices if no task is to be processed or is able to be processed in either of the two control devices.

12. The method according to claim 1, wherein at least one priority signal being exchanged between the two control devices, which indicates that the sending control device has a certain priority and that the receiving control device, in the case of a lower priority, either emits the release for the execution of an adaptive task to the other control device immediately or after the adaptive task being executed has concluded.

13. The method according to claim 1, wherein the information being stored in a non-volatile fashion in a memory prior to switching off the first and second control device, for which control device the release signal is switched to active.

14. The method according to claim 1, wherein, during boot-up of the two control devices, a first control device checking whether the release signal is stored as active for one of the two control devices, with the first control device setting the first switchover signal to active if neither the first nor the second release signal is stored as active, with the first control device transmitting the first release signal, which is inactive, and the second switchover signal to the second control device.

15. The method according to claim 2, wherein an active first control device, which has just executed an adaptive task or if no task to be executed exists, checks prior to a transfer to the other second control device the state of the switchover signal of the second control device, and wherein the first control device only setting the first release signal to inactive in the case of an inactive state of the switchover signal and setting the first switchover signal to active, wherein the first release signal and the first switchover signal being transmitted to the second control device.

16. A system comprising:

a first control device for executing tasks for an internal combustion engine, a second control device for executing tasks for the internal combustion engine;

a signal path connecting the first and the second control device, the first control device having a first memory retaining a first release bit for a first release signal and a first switchover bit for a first switchover signal, the second control device having a second memory retaining a second release bit for a second release signal and a second switchover bit for a second switchover signal, and wherein the system is designed such that when adjusting operating parameters of the internal combustion engine, only one of the two control devices is executing an associated adaptive task at a time and the two control devices do not simultaneously execute defined adaptive tasks but instead define by way of exchanging the first and the second release signal and the first and the second switchover signal that only one control device can execute a defined adaptive task at the same time;

wherein the first control device and the second control device cooperatively control respective actuators of the internal combustion engine.

17. The system according to claim 16, wherein the first control device controls functions for a first number of cylinders in the internal combustion engine, wherein the second control device controls a function of a second number of cylinders in the internal combustion engine, and wherein a cylinder equalization being executed by the first or second control device as an adaptive task.

18. The system according to claim 16, wherein the system is operable to exchange at least one priority signal between the two control devices, which indicates that the sending control device has a certain priority and that the receiving control device, in the case of a lower priority, either emits the release for the execution of an adaptive task to the other control device immediately or after the adaptive task being executed has concluded.

19. The system according to claim 16, comprising a non-volatile memory for storing the information prior to switching off the first and second control device, for which control device the release signal is switched to active.

20. The system according to claim 16, wherein an active first control device, which has just executed an adaptive task or if no task to be executed exists, checks prior to a transfer to the other second control device the state of the switchover signal of the second control device, and wherein the first control device only setting the first release signal to inactive in the case of an inactive state of the switchover signal and setting the first switchover signal to active, wherein the first release signal and the first switchover signal being transmitted to the second control device.

* * * * *